(12) United States Patent
Smith (10) Patent No.: US 7,303,366 B2
(45) Date of Patent: Dec. 4, 2007

(54) THREE PART BLIND FASTENER

(75) Inventor: Daniel R. Smith, Kidderminster (GB)

(73) Assignee: Newfrey LLC, Newark, DE (US)

( * ) Notice: Subject to any disclaimer, the term of this patent is extended or adjusted under 35 U.S.C. 154(b) by 0 days.

(21) Appl. No.: 10/886,148

(22) Filed: Jul. 7, 2004

(65) Prior Publication Data

US 2005/0013678 A1   Jan. 20, 2005

(30) Foreign Application Priority Data

Jul. 16, 2003  (GB)  ................... 0316602.2

(51) Int. Cl.
*F16B 13/04* (2006.01)
*F16B 19/08* (2006.01)

(52) U.S. Cl. .................. 411/43; 411/501; 411/969; 411/34; 411/38; 411/37

(58) Field of Classification Search ............... 411/42, 411/43, 34, 38, 501, 969, 35, 36, 37, 45–48; 470/27, 29, 30, 31
See application file for complete search history.

(56) References Cited

U.S. PATENT DOCUMENTS

| | | | | |
|---|---|---|---|---|
| 2,040,939 | A | * | 5/1936 | Huck ........................ 470/29 |
| 2,324,142 | A | * | 7/1943 | Eklund ...................... 411/38 |
| 2,673,336 | A | * | 3/1954 | Peters ....................... 439/870 |
| 3,013,643 | A | * | 12/1961 | Perry ........................ 403/224 |
| 3,181,413 | A | * | 5/1965 | Wing ......................... 411/34 |
| 3,236,143 | A | * | 2/1966 | Wing ......................... 411/34 |
| 3,534,936 | A | * | 10/1970 | Knowlton ................... 248/653 |
| 3,657,955 | A | * | 4/1972 | McKay ...................... 411/38 |
| 3,667,340 | A | * | 6/1972 | Black et al. ................ 411/38 |
| 4,189,997 | A | * | 2/1980 | Nozaki et al. ............. 101/93.09 |
| 4,230,017 | A | * | 10/1980 | Angelosanto ............... 411/34 |
| 4,826,372 | A | * | 5/1989 | Kendall ..................... 411/43 |
| 5,025,128 | A | * | 6/1991 | Derbyshire ................. 219/200 |
| 5,074,726 | A | * | 12/1991 | Betchel et al. ............. 411/34 |
| 5,603,592 | A | * | 2/1997 | Sadri et al. ................ 411/34 |
| 5,645,383 | A | * | 7/1997 | Williams .................... 411/43 |
| 5,860,780 | A | * | 1/1999 | Lenac et al. ............... 411/501 |
| 6,004,086 | A | * | 12/1999 | Gand et al. ................ 411/38 |
| 6,247,883 | B1 | * | 6/2001 | Monserratt ................. 411/34 |
| 6,254,325 | B1 | * | 7/2001 | Kun .......................... 411/38 |

(Continued)

FOREIGN PATENT DOCUMENTS

EP          936362 A2 *  8/1999

(Continued)

*Primary Examiner*—Katherine Mitchell
(74) *Attorney, Agent, or Firm*—Harness, Dickey & Pierce, P.L.C.

(57) ABSTRACT

The current invention is directed to a three piece blind fastener comprising a mandrel 40, a tubular body portion of 10 and a radially extending flange 14, wherein the cylindrical body 10 is mounted on an elongate stem 42 of the mandrel so as to extend co-axially about a central axis of such blind fastener, and the mandrel having a mandrel head in operative engagement with a tail end of the body for transmitting force there to during setting of the fastener, wherein the radially extending flange is separate from and held in crimped engagement with the body portion at or towards a front end of the tubular body so as to be axially remote from the tail end of such body.

16 Claims, 5 Drawing Sheets

U.S. PATENT DOCUMENTS 6,537,005 B1 * 3/2003 Denham ................ 411/42
6,761,520 B1 * 7/2004 Dise ..................... 411/38
6,826,820 B2 * 12/2004 Denham et al. ......... 29/524.1
6,893,196 B2 * 5/2005 Wille .................... 411/34

FOREIGN PATENT DOCUMENTS

| EP | 1 103 732 A2 | 5/2001 |
| EP | 04 01 5489 | 3/2006 |
| GB | 0633479 A * | 12/1949 |
| GB | 2310904 A * | 9/1997 |

* cited by examiner

THREE PART BLIND FASTENER

BACKGROUND OF THE INVENTION

The present invention relates to tubular blind fasteners of the type that can be inserted through a preformed hole in a work piece and secured therein by a setting operation carried out from one side of such work piece. More particularly, this invention is directed to a blind fastener utilising a pull mandrel to effect the setting operation by compressing and deforming the tubular body of the fastener to compress such work piece between the deformed part of the body and a radially extending flange. There are numerous variants of such type of blind fastener, such as those generally known as a blind rivet, an example of which is such as that sold by the applicant under their registered trademark POP®.

Such blind rivets of standard sizes are heavily employed by many different industries and are hence manufactured in extremely large numbers, thereby minimising manufacturing costs and justifying investment in the expensive tooling required to manufacture such rivets.

Blind fasteners of this type provide an extremely effective and useful fastening component allowing connection to or securing of two or more work pieces, particularly where access is limited or restricted to one side of that work piece. This desirable trait is not limited to the commonly available sizes of blind rivet, but is equally applicable to specialised blind fasteners having larger length and/or diameters. In addition, specialised applications of such type of blind fasteners require fasteners utilising high performance and more intractable materials such as stainless steel. Other applications require fasteners made from higher strength materials and which are also required to be corrosion resistant, whereby the use of materials such as nickel/copper alloy are preferred. These non standard materials (as opposed to commonly used aluminium or steel), present specific difficulties in the manufacture of blind fasteners often necessitating compromise in the choice of material between its workability, strength and its corrosion resistance. In addition, to produce blind fasteners, particularly very large diameter blind fasteners specifically having a range of different lengths, is very expensive and time consuming, necessitating large and costly manufacturing machines and expensive tooling, the cost of which is often difficult to recoup due to the relatively low volumes required of such specialist blind fasteners. The volume of product required does not justify the expense of the manufacturing equipment. Even though many existing production machines have adequate forging load capacity, longer lengths of blind fastener may require larger machines since lengths of blind fastener often extends beyond the stroke capabilities of that particular machine. Additionally, different lengths of rivet require different sets of tooling for each length which further increases the cost of the manufacturing equipment and hence the product.

Additionally, where rivets are required for high performance and necessitate more intractable materials such as stainless steel, then the production of rivets from such material requires more robust and slower running production machines, such reductions in speed further increase manufacturing costs whereby the strength of the materials being used result in the associated production tools having a dramatically reduced life expectancy.

Still further, where it is desirable to produce a rivet requiring compromise between the choice of material in terms of its workability and its corrosion resistance, that there is a need for a material where the body portion of the rivet may different to that of the rivet head which, under conventional construction, would be impossible to achieve. This has lead to the development of very specialised types of blind fastener whereby the collar or flange portion is swaged on to a tubular rivet body.

This type of swaged collar type of blind fastener consists of essentially of a tubular rivet body with an integral swaging collar on a central setting mandrel. Such blind fasteners are extremely expensive to manufacture. In practice this type of fastener is applied by inserting the pulling portion of the setting mandrel into the pulling jaws of a conventional setting tool, while a shaped nose piece of the setting tool engages the swaging collar. As the pulling jaws retract, the blind side of the fastener collapses forming a characteristic blind side spread, whereby as the setting load further increases, the swaging collar is forced inwardly of the rivet body so that the collar material enters holding grooves of the setting mandrel. On completion of the setting operation, the setting load increases until the mandrel breaks at a predetermined point and load.

However, since the swaging collar and tubular body are in one piece, then any heat treatment applied to such fasteners is applied equally to both parts, making a compromise on their relative functions. For instance, a collar portion requires to be fully annealed so that it can be swaged with a relatively low load whereby the body portion may need to be partially annealed so it does not collapse prematurely and be overset before the deformation of the swaging collar has time to engage in the holding grooves on the pin.

SUMMARY OF THE PRESENT INVENTION

It is therefore an object of the present invention to provide a novel blind fastener and method of manufacturing such a novel blind fastener in a variety of shapes and material which alleviates the aforementioned problems in a simple and cost effective manner.

According to the present invention there is now provided a three piece blind fastener comprising a mandrel, an elongate tubular body portion and a radially extending flange, wherein the cylindrical body is mounted on an elongate stem of the mandrel so as to extend coaxially about a central axis of the blind fastener and the mandrel having a mandrel head in operative engagement with a tail end of the body for transmitting force thereto during setting of the fastener, characterised in that the radially extending flange is held in crimped engagement with the body portion at or towards a front end of the tubular body so as to be axially remote from the tail end. This fastener will resemble a conventional blind fastener except that the flange will be formed as a separate piece and mechanically secured to the rivet body as opposed to been integrally formed therewith allowing materials of different size, shape and composition to form the rivet body and the rivet flange.

Preferably, the flange will be crimped between two radially deformed portions of the tubular body, which radially deformed portions having a greater external diameter than the body. At least one of the radially deformed portions will usually comprise of a roll type rib and, preferably, both deformed portions will be formed as role type ribs. The use of role type ribs provides for ease on manufacturing being formed simply by compressing the cylindrical body portion to effect outward radial deformation at predetermined positions.

It is preferred that a front one of the two radailly deformed portions of the body, which is immediately adjacent to the front end thereof, will comprise a roll type rib formed by the front end of the body, wherein the axially outer most wall of this roll type rib is inclined relative to the central access of the fastener, preferably at an angle of between 20 and 70 degrees relative to such axis and, more particularly, within the range of 35 to 50 degrees. Such inclination of the otuer wall of the front roll type rib to, permit additional compressive forces to be applied thereto for crimping the flange between the radially deformed portion of the body as a setting force is applied thereto by a setting tool during conventional setting of this type of blind fastener.

It is further preferred that the flange will comprise an inner aperture for receiving the tubular body, which aperture having at least two diametrically opposed and inwardly facing side edges for restraining engagement between the two radially deformed portions of the body. While such aperture should be any shape presenting two edges to co-operate with such deformed portions, its preferred that the aperture will be circular and will have a diameter comparable to the diameter of the cylindrical body so as to be received in complimentary engagement therewith, preferably by frictional engagement therewith.

Usually, the flange will be substantially tubular having an inwardly extending circumferential rib disposed part-way along an axial length thereof, this rim defining the side edges of the aperture. Usually the rim will be disposed remote from both axially opposed ends of the flange, usually having been formed by two counterbored recesses formed from each opposed face of the flange body.

Preferably, the body will have, adjacent at tail end, a preformed deformation zone, usually formed by a weakness within the body, to facilitate deformation at a predetermined position of the body during setting of the fastener.

Since the flange will be connected to the fastener body during its manufacture, different materials maybe used to form both the flange and the body, allowing materials of different properties to be applied to achieve different functions.

Further according to present invention, there is also provided a method of manufacturing of a three part blind fastener, comprising the steps of forming first radially extending rib on an outer surface of an elongate cylindrical fastener body, forming a fastener flange so as to have an aperture therethrough of diameter comparable to the body outer diameter, which aperture having a diameter less than the external diameter of the first rib, then inserting the body through the aperture of the flange until an edge of the flange aperture abuts the first rib, then compressing the fastener body to form a second regularly extending roll type rib on the longitudinally opposed side of the flange aperture so as to compress the flange between the first and second ribs; then inserting a mandrel through the fastener body for an elongate stem of the mandrel to extend co-axially about a central axis of the body and bringing a head of the mandrel into operative engagement with a tail end of the body which is longitudinally remote from the mounted flange. This provides a simple means for forming a three part blind fastener allowing flanges of different materials shapes, sizes to be mounted on different length of fastener body of the diameter. The different diameter fastener bodies will simply necessitate flanges having different flange aperture sizes.

While the first rib may be formed by a variety of different means, it is preferred that such first rib is formed by longitudinally compressing the elongate cylindrical body to effect collapse at a predetermined position to form a first radially extending roll type rib. It is also preferred that the aperture in the fastener flange is formed as an internal circumferential rim on a tubular flanged body. Usually, the rim is formed by producing a counterbored recess in at least one, and usually two, longitudinal end faces of the tubular flange.

It is also preferred that this step of forming the second role type rib comprises deforming an outer end of the body to be inclined at an angle of between 25 and 70 degrees relative to a longitudinal axis of the body.

This method preferably employs the use of two different materials to form the flange and fastener body respectively.

BRIEF DESCRIPTION OF THE ACCOMPANYING DRAWINGS

A preferred embodiment of the present invention will now be described, by way of example only, with reference to the accompanying illustrative drawings in which.

DETAILED DESCRIPTION OF THE PREFERRED EMBODIMENT

The present invention is directed to a three part blind fastener and, for this example, a three part blind rivet comprising a rivet body, a rivet flange and rivet mandrel.

Figure 1:
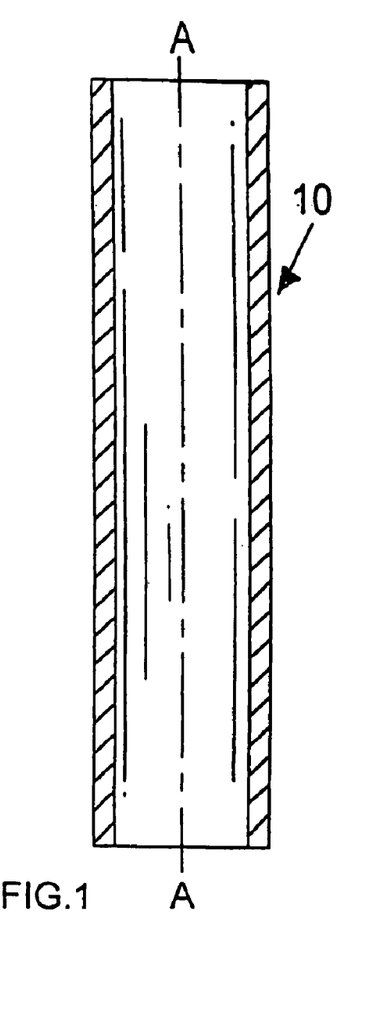
FIG. 1 shows a cross-sectional view of tubular body.
Figure 2:
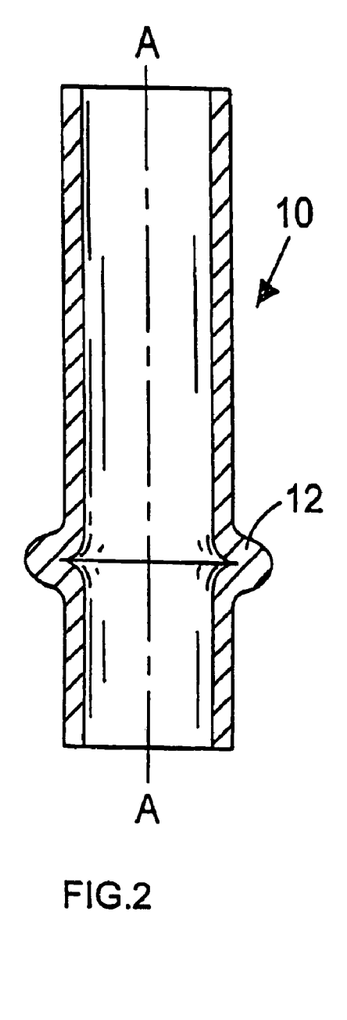
FIG. 2 shows a cross-sectional view of the body of FIG. 1 having a roll type rib formed therein.

Construction of this three part rivet will now be described sequentially with reference to the accompanying Figs. Firstly, referring to FIG. 1, an appropriate length of cylindrical tube is produced to form the rivet body 10. This may be made of any material having specific material characteristics required by the intended operation and use of the rivet to be constructed. Usually this will be formed by cutting a required length from pre-formed tube. Referring to FIG. 2, the rivet body 10 is reduced in length by longitudinally compressing the tube by application of axially directed compressive forces so that, at a predetermined point on the tubular body, the tube collapses to form a first roll type rib 12 extending around the circumference of the body 10 in a plane substantially perpendicular to a tube axis A. The external diameter of this first roll type rib 12 will be greater than the external diameter of the non-deformed tubular body portion 10.

Figure 3:
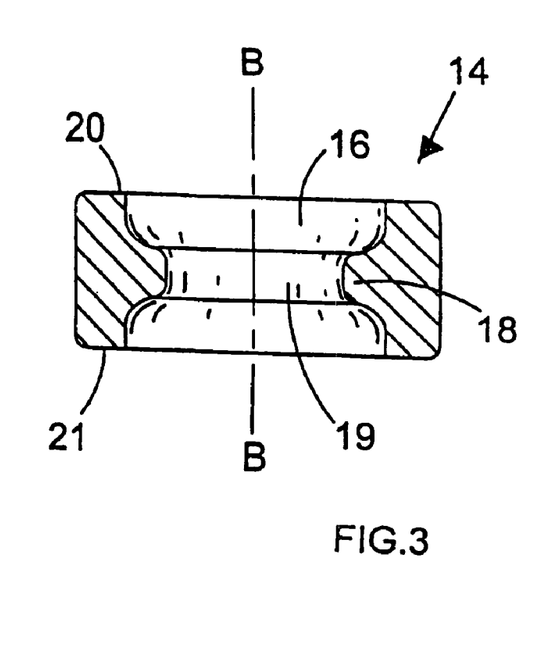
FIG. 3 shows a cross sectional view of a ribbed flange for co-operating engagement with the ribbed body of FIG. 2.

Referring now to FIG. 3, a separate rivet flange portion 14 is shown in cross section. This flange portion 14 is again substantially cylindrical having a central axis B. This flange portion 14 has a uniform internal and external diameter with an internal radially extending circumferential rim 18 midway along its longitudinal length. This rim 18 is formed by the production of two counterbored recesses 16 extending inwardly from each of the end faces 20 and 21 respectively of such flange portion. It will be appreciated, in a simplified embodiment of the present invention, that the flange itself could simply comprise a flattened disc having a uniform central aperture.

The extension of the rim 18 into the bore of the flange produces a flange aperture 19 having a diameter which is preset so as to be comparable and usually equal to the actual diameter of the non-deformed tubular body 10.

Figure 4:
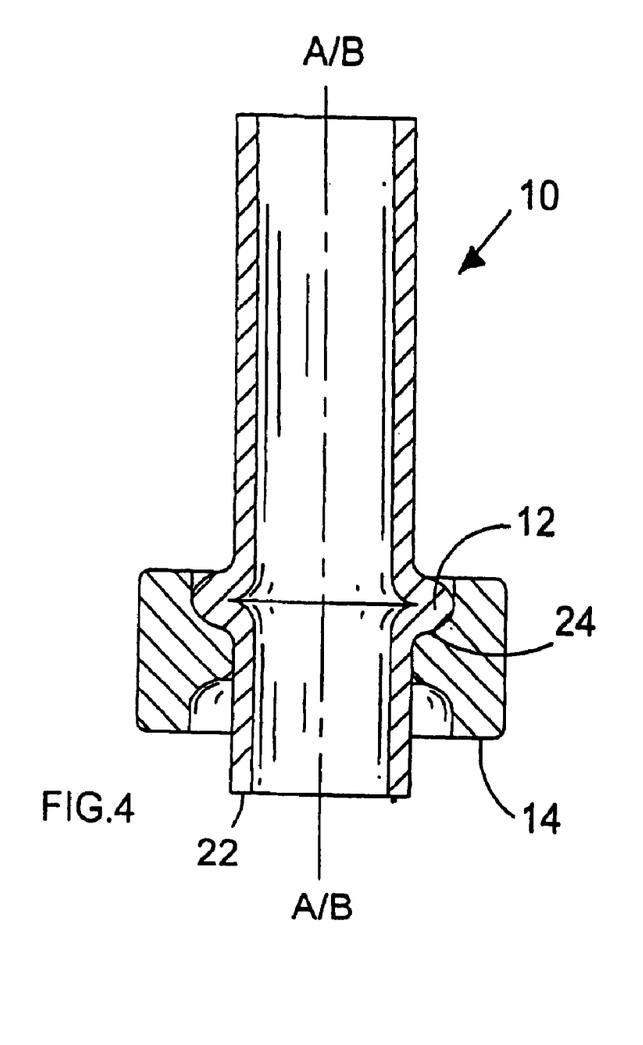
FIG. 4 shows a cross sectional view of the ribbed body of FIG. 2 with the flange of FIG. 3 mounted thereon.

As seen in FIG. 4, the flange portion 14 is then slideably received over a front end 22 of the rivet body 10 until a first shoulder 24 formed by the rim 18 of the flange portion 14 is brought into an engagement with the first roll type rib 12. Since a diameter of the flange aperture 14 is of comparable size to the diameter of the tubular body 10, it is received in frictional engagement therewith so that a frictional retaining force holds the flange 14 in the position shown in FIG. 4. While the diameter of the flange aperture need not be of comparable size to the tube body to effect such frictional engagement, it is required to be less than the external diameter of the first roll type rib 12 so as to maintain it in the position shown in FIG. 4. In this position, the longitudinal axis B of the flange portion 14 is coincident with the longitudinal axis A of the rivet body 10.

Figure 5:
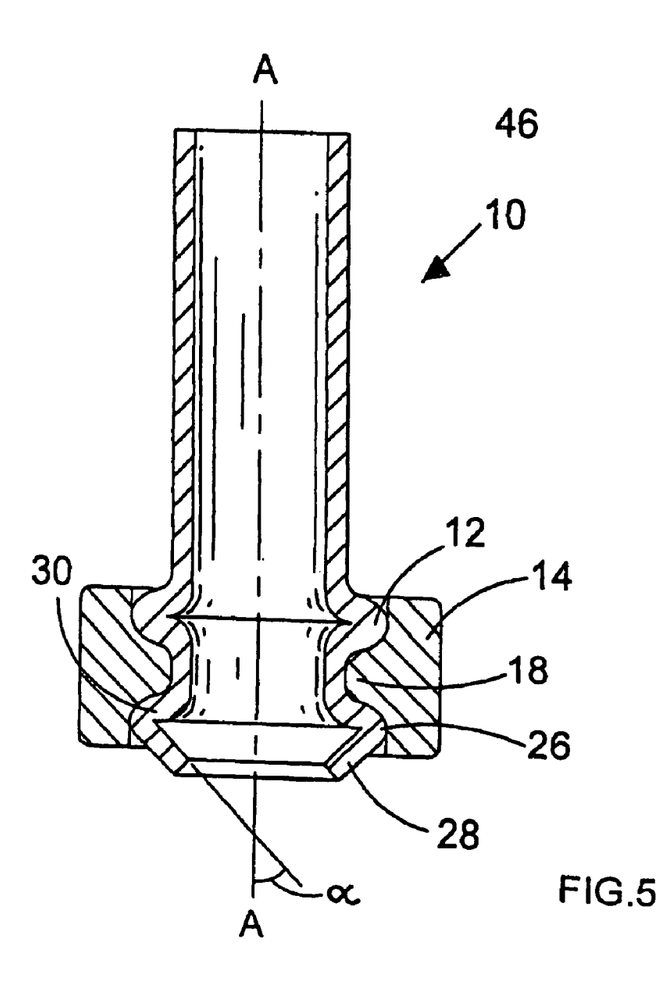
FIG. 5 shows a cross sectional view of the ribbed body of FIG. 4 with flange crimped thereon.

Referring to FIG. 5, the flange portion 14 is then secured to the tubular body portion 10 by forming a second longitudinal compression operation on the rivet body 10 to form a second roll type rib 26 as the tube collapses at a second predetermined position. Again, this second roll type rib 26 extends in a plane substantially perpendicular to the rivet body axis A and serves to compress the internal rim 18 of the flange portion 14 between the two roll type ribs 12 and 26 to effect a crimped securement of the flange portion 14 on the rivet body. In this position the flange portion 14 is secured from longitudinal displacement relative to the rivet body 10.

In this preferred embodiment of the present invention the outer most, or front wall, 28 of this second roll type rib 26 (formed by the front end 22 of the rivet body) is only partially closed with respect to the inner wall portion 30 of the second roll type rib 26, so as to be inclined at an angle α relative to the body axis A of approximately 30°. This angle α may be in the range of 20° to 70° but is preferably be in the range of 35° to 50°. The purpose of the inclination of this front end wall 28 of the second roll type rib 26 will be described below.

The mounting of the flange portion 14 on the rivet body 10 produces a rivet body operationally comparable to conventional blind rivet, whereby a conventional mandrel 40 is then integrated within this rivet body in a conventional manner.

Figure 6:
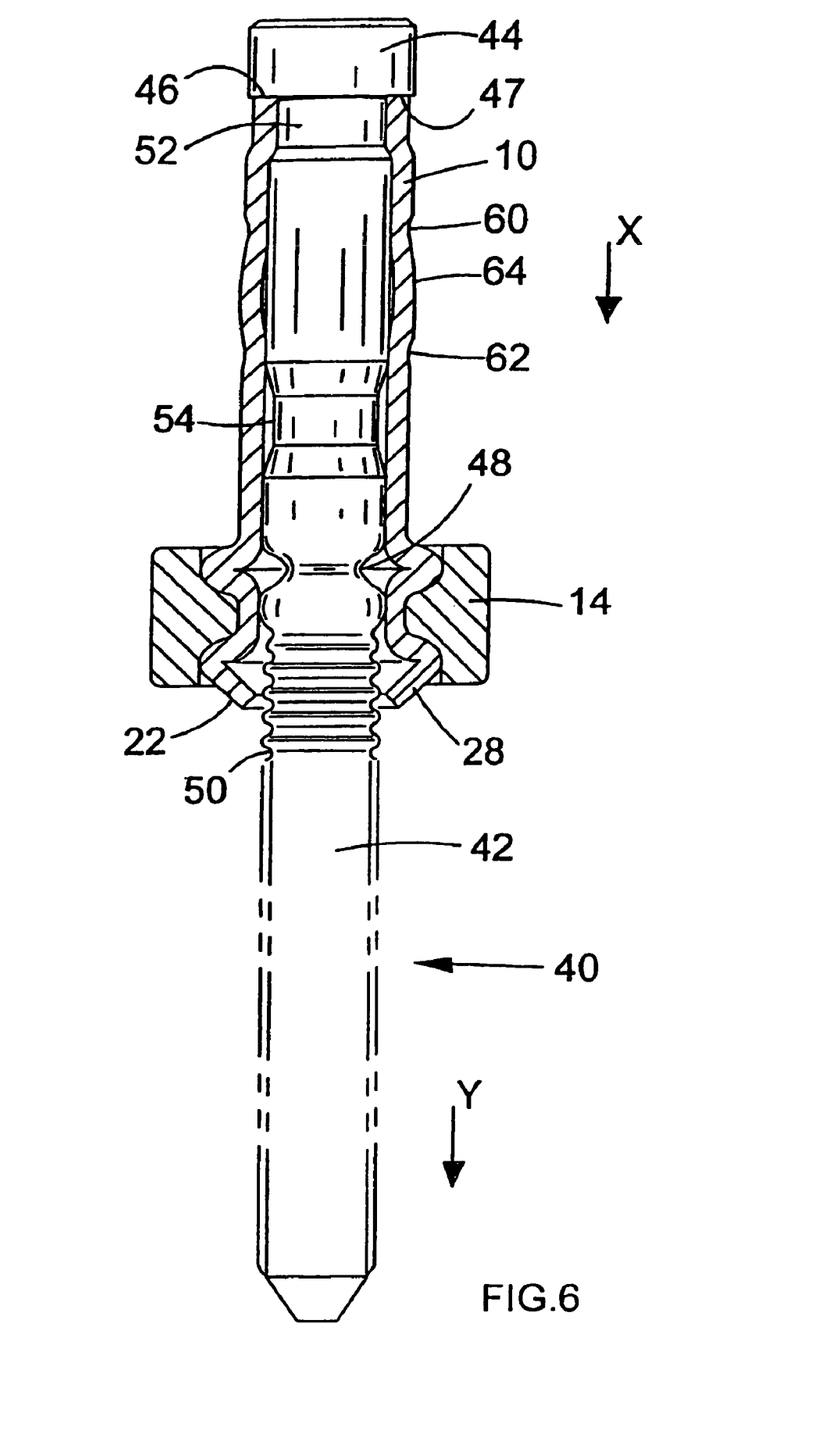
FIG. 6 shows a cross sectional view of the three part blind rivet of the present invention and incorporating the ribbed body and flange of FIG. 5.

As shown in FIG. 6, the mandrel 40 comprises an elongate cylindrical mandrel stem 42 which is longitudinally inserted through the rivet body 10, in a direction generally indicated by arrow X in FIG. 6, until such time that an enlarged diameter mandrel head 44 abuts a tail and face 46 of the rivet body 10, as is conventional. As for conventional blind rivets, the mandrel head 44 is provided with a shoulder portion 47 between its external diameter and that of the diameter of the mandrel stem 40, so as to be able to apply a compressive force to the tail end portion 46 of the rivet body during setting of the blind fastener.

Again, as standard for blind rivets, the mandrel stem 42 is provided with a break or neck portion 48 having a narrower diameter than the mandrel stem 42, which provided a point of weakness or break point along which the mandrel stem will break during setting operation. As can be further seen from FIG. 6, the mandrel stem 42 is also provided with the series of grooves to enhance its setting operation. The mandrel stem, adjacent the front end 22 (28) of the rivet body 10 as shown in FIG. 7, comprises a series of circumferential grooves 50 to facilitate a better grip for a rivet setting tool (not shown) on the mandrel stem.

An additional mandrel groove 52 (FIG. 6) is formed circumferentially about the mandrel stem 42 immediately adjacent the mandrel head 44 for receipt of material from the tail end portion of the rived body 10 during the manufacturing operation. In this manner, the rivet body 10 can be rolled once the mandrel has been inserted therein so as to deform a portion of the rivet body into this groove 52 so as to effect a positive engagement between the rivet body and the mandrel. A further groove 54 formed in the mandrel of stem 42 between the groove 52 and the mandrel neck portion.

Figure 7:
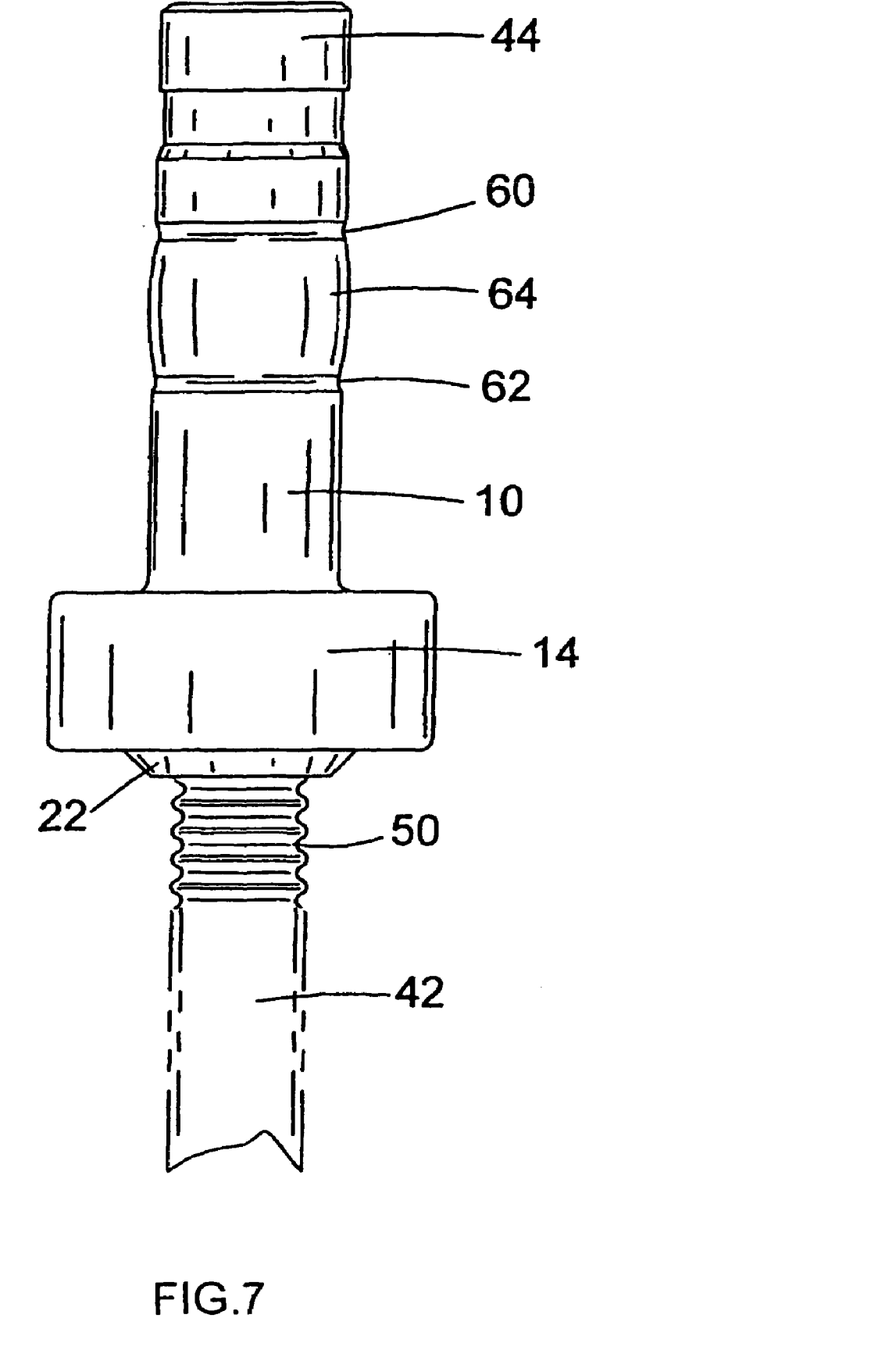
FIG. 7 shows an external view of the three part blind ribbed of FIG. 6.

Finally, again as shown in FIG. 6 and FIG. 7, the rivet body 10 is rolled to produce two sets of external circumferential grooves 60, 62 whereby the portion of the tubular rivet body 64 between these two grooves is caused to lengthen slightly and form a barrel-like portion of the rivet body, creating a roll type bulge at a predetermined position on the rivet. Effectively these grooves 60, 62 and bulge 64 provide a deformation zone to facilitate deformation of the rivet body 10 of a predetermined position during a setting operation of such blind rivet. It is to be appreciated that other forms of deformation zone are feasible for achieving the same purpose so as to control where such rivet deforms during the setting operation so as to meet predetermined thickness setting requirements.

Figure 8:
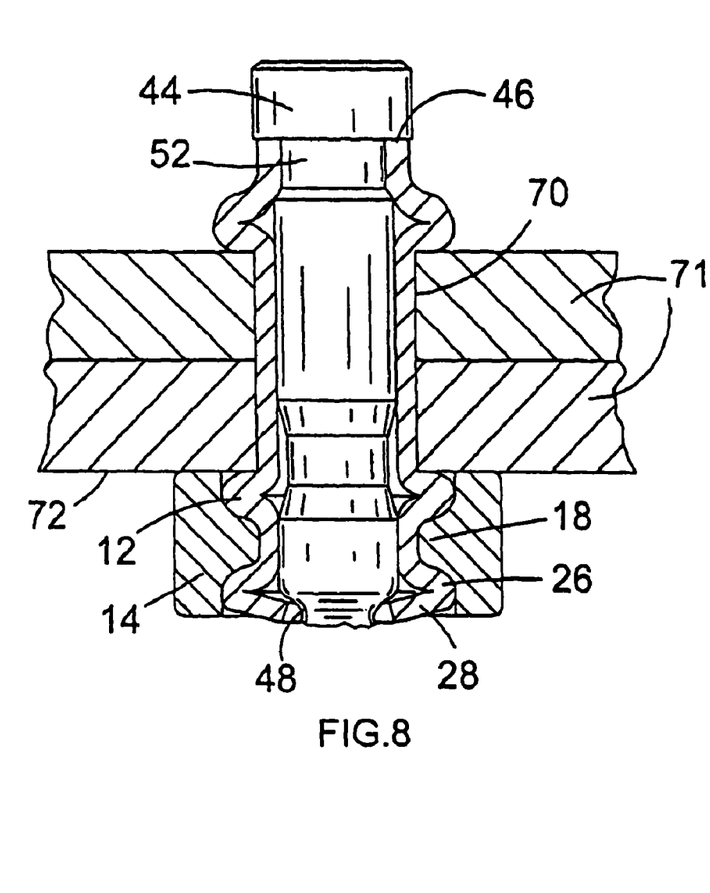
FIG. 8 shows a cross sectional view of the three part ribbed body of FIG. 6 in a first set configuration having a maximum grip thickness.
Figure 9:
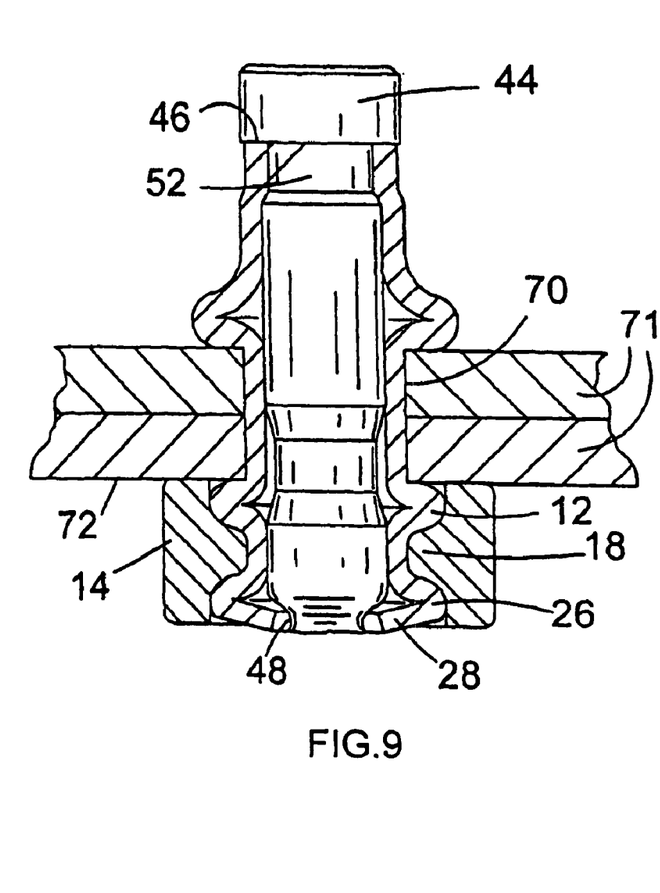
FIG. 9 shows the three part blind rivet of FIG. 6 in a second set configuration for a minimum grip thickness.

In use, the blind fastener construction shown in FIG. 6 is then set in a conventional manner for blind rivets. As shown in FIGS. 8 and 9 the tail end portion 46 of the rivet body will be inserted through a preformed hole 7 in a work piece 71 (or work pieces) until the flange portion 40 is brought into abutment with the front surface 72 of such work piece. A rivet setting tool (not shown) has a shaped nose piece which engages with the inclined outer wall 28 of the second roll type rib 26 (effectively engaging the front end of the rivet body 10) to apply a holding force to the rivet maintaining the flange portion 14 in engagement with the work piece front surface 72. Pulling jaws of the rivet setting tool then grasp and apply a setting force to the mandrel stem 42 in a direction indicated by arrow Y in FIG. 6, thereby applying a conventional, setting force on the rivet body 10, transmitted to the tail end face 46 of the rivet body 10 through the mandrel head 44. Since the setting force Y is transmitted through the mandrel head 44, thereby attempting to displace the rivet body 10 in a downward direction (when viewed in FIG. 6), such downward movement is arrested by engagement of the rivet body 10 (particularly at its front end 22 (28) thereof) with the nose piece of the rivet setting tool. Here the effect of the inclination of the front wall 28 of the second roll type rib 26 will be appreciated, as the angle α will serve to direct this compressive force directly into the second roll type rib 26 so as to maintain it in compressed engagement with the flange portion 14.

The rivet body 10 is then deformed in a conventional manner, as shown in FIGS. 8 and 9 (each representative of deformation of the rivet body at a different predetermined position so as to effect minimum or maximum grip thickness respectively dependent on the thickness of the work pieces to be fastened between the flange portion 14 and the deformed portion of the rivet body). As the blind side setting of the rivet is finally formed (as shown in FIGS. 8 and 9) the setting load on the mandrel increases and the inclined face 28 of the second roll type rib is then forced into the mandrel break groove 48 thus trapping the mandrel from further displacement. As load further increases, the mandrel breaks at a predetermined point and load at this break neck 48 as is conventional. In this manner, the second roll type rib 26, having been displaced into the break groove, serves to retain the mandrel within the set blind rivet as shown, while maintaining a crimped compressive force between the two roll type ribs and the rivet flange. Furthermore, since the rivet body 10 has already been compressed into the mandrel groove 52 (as previously described) this further serves to retain the mandrel within the set blind rivet as shown.

While the present invention is described with reference to a conventional blind rivet design, the manufacturing technique and construction of blind rivets according to the present invention can be applied to any type of blind rivet inclusive of closed end blind rivets, peel type blind rivets, self piercing blind rivets etc. Once the rivet body has been formed and the separate flange portion connected thereto, the rivet body can be joined with the appropriate mandrel to form any one of these known type of blind rivet constructions.

In addition, while these preferred embodiments utilises the formation of a first roll type rib to form a first rib to engage the flange portion 14, it will be appreciated that such rib 12 could equally be constructed by other manufacturing techniques. For example, it is possible to simply weld such a radial circumferential projection onto a standard tubular body. Alternatively, such rib could be ground into a cylindrical body. In addition, while the flange portion 14 is shown having two counterbored recesses to form an inner rim 18, this mandrel flange (or head) 14 could simply comprise a substantially flat disc having an inner diameter comparable to the inner diameter of the rim 18, and an outer diameter comparable to the outer diameter of the flange portion 14. Yet further, more complex flange portion designs are equally conceivable provided they are provided with an appropriate internal rim 18 defining a flange rim for co-operative crimped engagement between the two ribs 12 and 26. The flange portions could be domed or otherwise externally profiled as required to be comparable with the existing types of blind rivet design. This flange portion 14 could be further enhanced to have other operative functions such as being provided to project beyond the front end of the body so as to provide a connection portion once the rivet has been set.

Since the body portion 10 and the flange portion 14 can be manufactured separate from one another it is now possible to provide an inexpensive manufacturing method and product incorporating different materials for different parts of the rivet. In particular, the body portion 10 can be made from tubular material conforming to the outer and inner dimensions of the required rivet body size. In this way, the cost of forging specialised size or shaped rivet bodies is avoided. In addition, the flange portion, being a common design for each diameter and length of rivet, can be made either by turning or forging on a relatively short stroke forging machine depending on the quantities required. Again the cost of expensive production machinery and costly tooling is alleviated.

Since the tubular portion of the rivet body is initially a different piece to the flange portion, it is now possible to make the body portion of a different material to that of the flange portion. For example, it would be possible to make the tubular body from stainless steel type 304 and the head portion from stainless steel grade 316. This would have the advantage of providing different capacities for corrosion resistance depending upon the environmental exposure application (i.e. the flange) while maintaining material having a high degree of body deformation for the rivet body. It is also possible to treat the head of the rivet separately to the body thus giving the opportunity to provide better aesthetics to the head of the rivet which will enable the more flexible and economic production process for specialised rivet designs. This could involve providing different heat treatment to the rivet body on the rivet head and to also the opportunity to provide a flange material which is aesthetically pleasing compared to the rivet body since only the rivet flange will be seen after setting.

A further advantage of the present invention is that the use of different materials to form the rivet flange may permit the use of plastics or other non-metallic materials to form such rivet flange.

What is claimed is:

1. A three piece blind fastener, configured to be inserted into an opening defined in a workpiece, the workpiece having a first surface, the fastener comprising:
   a mandrel; and
   an elongate tubular body portion and a radially extending flange, wherein said body portion is mounted on an elongate stem of said mandrel so as to extend co-axially about a central axis of said blind fastener and said mandrel having a mandrel head in operative engagement with a tail end of said body portion for transmitting force thereto during setting of said fastener, said radially extending flange defines an inner aperture and is separate from said body portion, said flange being held in crimped engagement with said body portion at or towards a front end of said body portion so as to be axially remote from said tail end, wherein said flange contacts said first surface of said workpiece and is configured to bear against said workpiece so said flange will not pull through said opening and wherein said body portion partitions said flange from said mandrel to prevent contact between said flange and said mandrel, wherein said flange is crimped between two radially deformed portions of said tubular body portion, said radially deformed portions having a greater external diameter than the body, wherein said flange comprises an inner aperture for receiving said tubular body portion, said aperture having at least two diametrically opposed and inwardly facing side edges for restraining engagement between said two radially deformed portions of said body portion, wherein said flange is tubular having an inwardly extending circumferential rim disposed partway along an axial length thereof, said rim defining said side edges of said aperture.

2. The blind fastener of claim 1, wherein at least one of said radially deformed portions comprises rib of axially-collapsed material.

3. The blind fastener of claim 2, wherein an axially outermost wall of said rib is inclined relative to said central axis of the fastener.

4. The blind fastener of claim 3, wherein said outermost wall is inclined relative to said central axis at an angle of between 25 and 70 degrees.

5. The blind fastener of claim 4, wherein said outermost wall is inclined relative to said central axis at an angle of between 35 and 50 degrees.

6. The blind fastener of claim 1 wherein said aperture is circular shaped.

7. The blind fastener of claim 6, wherein the diameter of said aperture is comparable to the diameter of said tubular body portion to be received in complimentary engagement therewith.

8. The blind fastener of claim 1, wherein said rim is disposed remote from axially opposed ends of said flange.

9. The blind fastener of claim 1 wherein said body portion, adjacent said tail end, comprises a preformed deformation zone to facilitate deformation at a predetermined position of said body during setting of said fastener.

10. The blind fastener of claim 1 wherein said fastener body portion comprises a first material and said flange comprises a second material.

11. The blind fastener of claim 1, wherein said mandrel comprises at least one groove into which at least part of the body portion can be displaced during a setting operation so as to retain said mandrel in said body of said blind fastener following a setting operation thereof.

12. A method of manufacturing the three part blind fastener of claim 1, comprising the steps of:
   forming a first radially extending rib on an outer surface of an elongate cylindrical fastener body;
   forming a fastener flange separate from said fastener body so as to have an aperture therethrough of diameter comparable to said body outer diameter but less than an external diameter of said first rib, said flange having a bearing surface configured to engage a workpiece;
   inserting said body through said aperture of said flange until an edge of said flange aperture abuts said first rib;
   compressing the fastener body to form a second rib of axially-collapsed material on the longitudinally opposed side of said flange aperture so as to compress said flange between said first and second ribs; and
   after compressing said flange between said ribs, then inserting a mandrel through said fastener body for an elongate stem of said mandrel to extend co-axially about a central axis of said body and bringing a head of said mandrel into operative engagement with a tail end of said body which is longitudinally remote from said mounted flange, wherein said aperture in said fastener flange is formed as an internal circumferential rim on a tubular flange body.

13. The method of claim 12, further comprising forming said first rib by longitudinally compressing said elongate cylindrical body to effect collapse at a predetermined position.

14. The method as claimed in claim 12, wherein said rim is formed by producing a counterbored recess in at least one longitudinal end face of said tubular flange.

15. The method of claim 12, wherein said step of forming said second rib comprises deforming an outer end of said body to be inclined at an angle of between 25 and 70 degrees relative to a longitudinal axis of said body.

16. The method of claim 12, comprising manufacturing said body of a first material and said flange of a second material.

* * * * *